United States Patent
Iida

[11] Patent Number: 5,117,742
[45] Date of Patent: Jun. 2, 1992

[54] PISTON OF COMPOSITE MATERIAL WITH C-SHAPED RING GROOVE

[75] Inventor: Toshio Iida, Yokohama, Japan

[73] Assignee: Iwata Air Compressor Mfg. Co. Ltd., Tokyo, Japan

[21] Appl. No.: 513,981

[22] Filed: Apr. 24, 1990

[30] Foreign Application Priority Data

Apr. 28, 1989 [JP] Japan ................................ 1-110276
Jun. 22, 1989 [JP] Japan ................................ 1-158236

[51] Int. Cl.$^5$ ........................... F01B 31/00; F16J 9/00
[52] U.S. Cl. ..................................... 92/126; 92/212; 92/248; 277/136; 277/216
[58] Field of Search ................ 92/212, 213, 222, 224, 92/248, 126; 277/136, 216, 218; 417/751, DIG. 1

[56] References Cited

U.S. PATENT DOCUMENTS

| | | | |
|---|---|---|---|
| 1,761,142 | 6/1930 | McCoy | 92/126 |
| 2,806,751 | 9/1957 | Sykes | 92/190 |
| 3,181,779 | 5/1965 | Rhodes | 92/248 X |
| 3,212,411 | 10/1965 | Storms | 92/248 |
| 3,358,914 | 12/1967 | MacMillan | 417/DIG. 1 X |
| 3,636,824 | 1/1972 | Clark | 92/249 |
| 3,656,414 | 4/1972 | Müller | 92/249 |
| 3,779,672 | 12/1973 | Schroeder | 92/248 X |
| 3,839,946 | 10/1974 | Paget | 92/153 |
| 4,306,489 | 12/1981 | Driver et al. | 92/212 |
| 4,312,106 | 1/1982 | Wanner et al. | 92/212 X |
| 4,367,702 | 1/1983 | Lassanske | 277/136 X |
| 4,440,069 | 4/1984 | Holtzberg et al. | 92/224 |
| 4,450,610 | 5/1984 | Schäper | 92/224 X |
| 4,540,352 | 9/1985 | Becker | 417/571 |
| 4,736,676 | 4/1988 | Taylor | 92/222 X |
| 4,881,455 | 11/1989 | Hirose | 92/248 |
| 4,909,133 | 3/1990 | Taylor et al. | 92/222 X |
| 4,911,983 | 3/1990 | Otani et al. | 428/408 |
| 5,017,683 | 5/1991 | Otani et al. | 528/396 |

FOREIGN PATENT DOCUMENTS

| | | | |
|---|---|---|---|
| 1135344 | 4/1957 | France | 92/213 |
| 60-26236 | 10/1977 | Japan | |
| 65-521 | 1/1987 | Japan | |
| 62-522 | 1/1987 | Japan | |
| 0286996 | 3/1928 | United Kingdom | 277/216 |

Primary Examiner—Edward K. Look
Assistant Examiner—John Ryznic
Attorney, Agent, or Firm—Foley & Lardner

[57] ABSTRACT

The present invention relates to an oilless reciprocating compressor and expansion apparatus each comprising a piston body to which a piston ring made of a self-lubricating material is fitted and a metal cylinder, and in the first invention and the second invention a self-lubricating material can be formed on the piston itself or on the circumferential surface side thereof without influencing adversely the durability of the piston itself by the compression heat at the piston top, and in the third invention a ring groove formed into the shape of the letter C whose ends are spaced a little is provided in the piston circumferential surface at least whose surface side is made of a self-lubricating material, and said ring groove is positioned on the side thrust line orthogonal to the piston pin, so that the compression efficiency is improved.

9 Claims, 8 Drawing Sheets

FIG. 7a
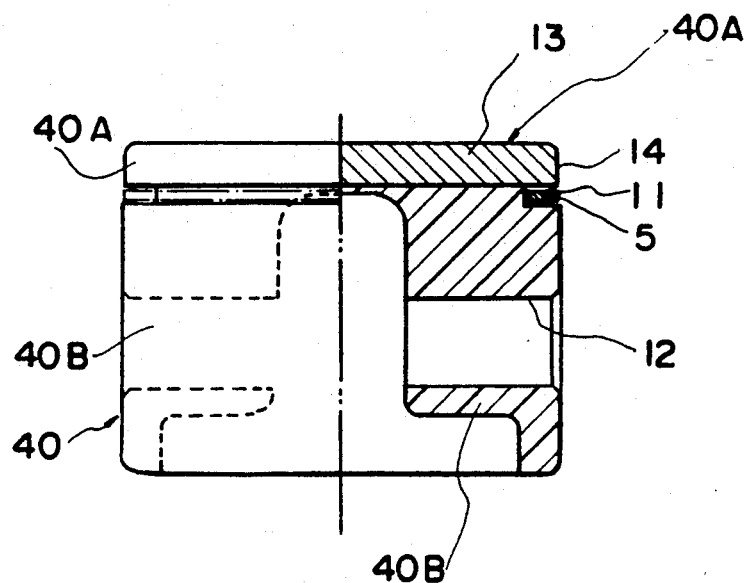
FIG. 7b
FIG. 7c
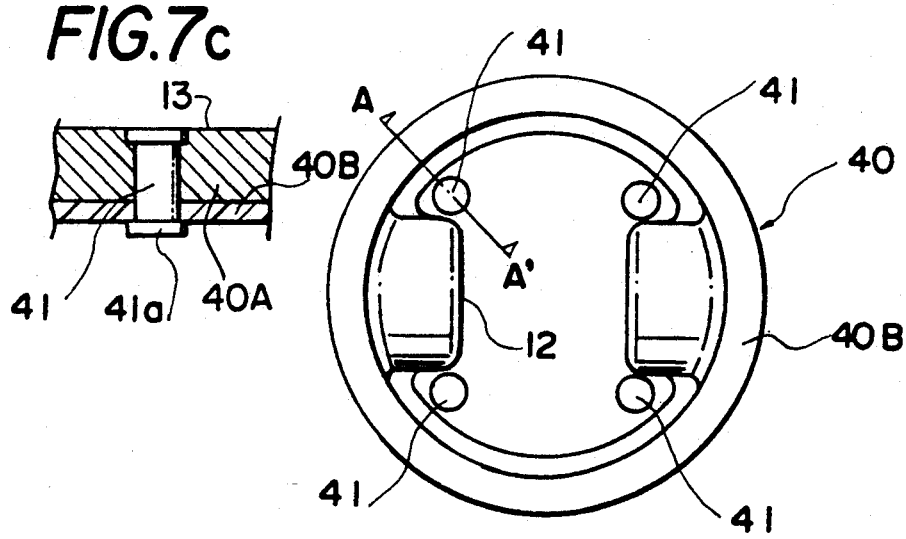

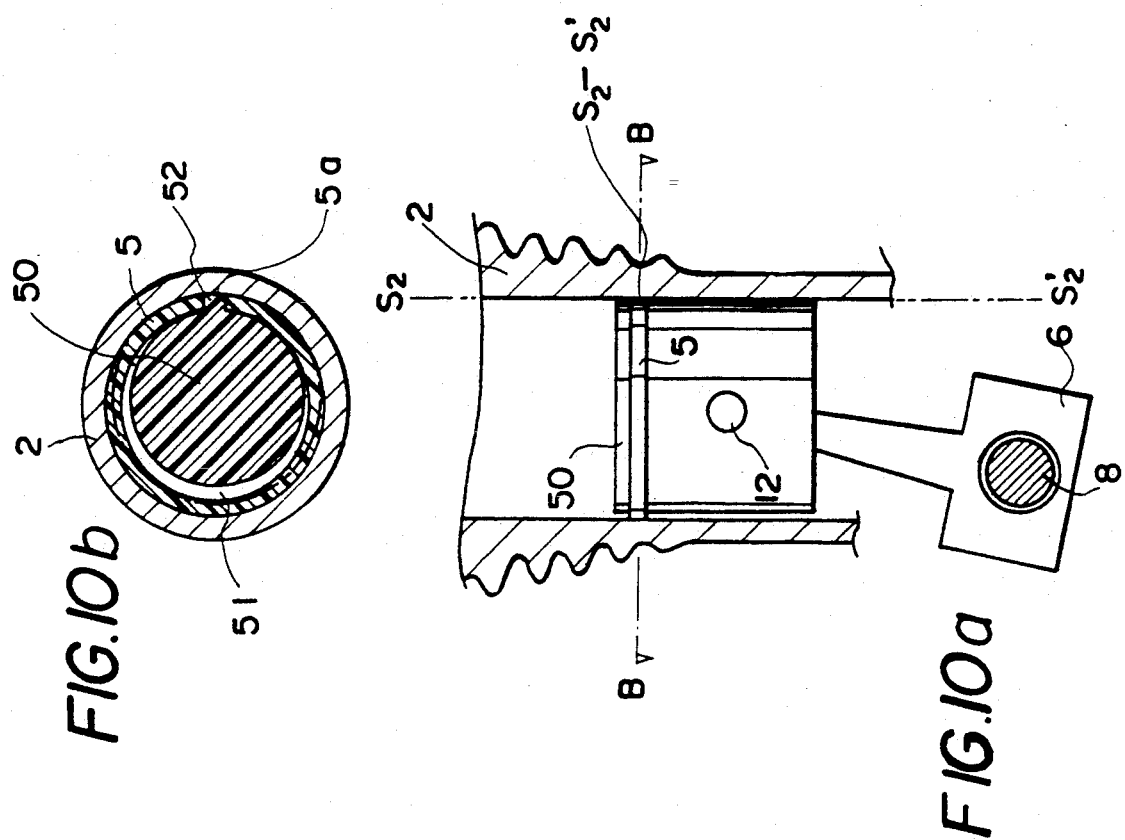
FIG.10b
FIG.10a
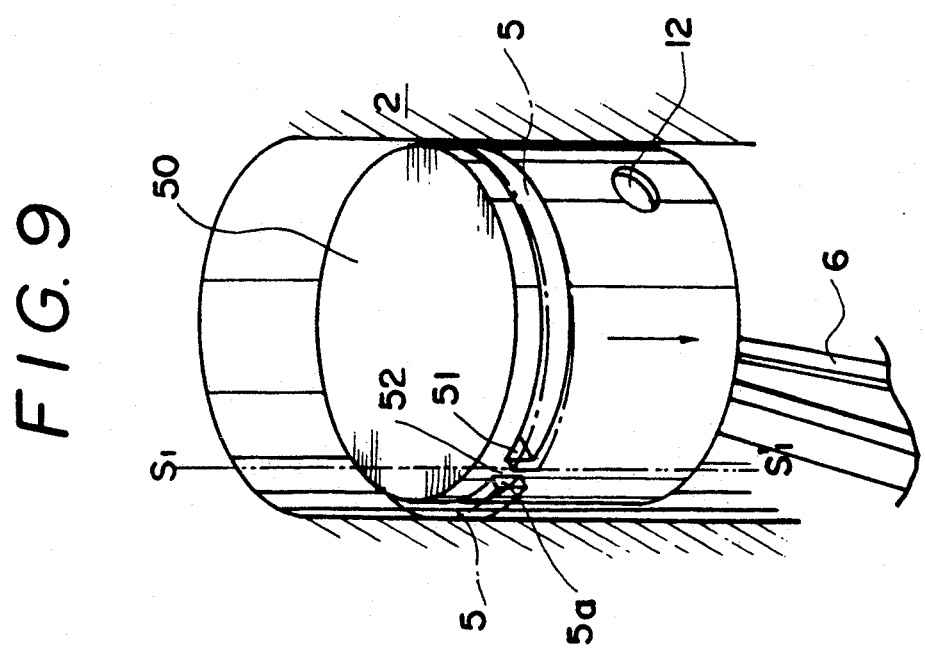
FIG.9

(A)

PISTON OF COMPOSITE MATERIAL WITH C-SHAPED RING GROOVE

DETAILED DESCRIPTION OF THE INVENTION

1. Technical Field

The present invention relates to an oilless reciprocating compressor and an oilless reciprocating expansion apparatus, and in particular to an oilless reciprocating compressor and an oilless reciprocating expansion apparatus each comprising a piston body to which a piston ring made of a self-lubricating material is fitted, and a metal piston.

2. Prior Art

Conventionally, oilless compressors and oilless expansion apparatuses are known which are constructed in such a manner that, in order to secure smooth slidability between the piston and the cylinder, for example, as shown in FIG. 3, multi-stage ring grooves 111a, 111b, 111c are formed almost throughout the outer circumferential surface from the top side of the piston 101 made of aluminum or other metal material to the skirt side, piston rings 105a, 105b and a rider ring 106 made of fluorocarbon resin or other self-lubricating resin are put in said ring grooves, and the outer diameter of the rings is set slightly larger than the outer diameter of the land section 102 (a ringlike projection for supporting the piston rings in the upper and lower ring grooves), so that only the self-lubricating piston rings 105a, 105b and the self-lubricating rider ring 106 (hereinafter referred to as ring body) come in contact with the cylinder, and thereby smooth slidability between the piston and the cylinder can be secured.

In such a fluid machine, since the cylinder is made of a metal material harder than the piston ring, the ring body is abraded by the sliding contact, and when the abrasion exceeds the limit by the long run, the outer circumference (the land section) of the piston comes directly and slidably in contact with the cylinder, and sometimes drag or the like takes place.

Particularly, in the case of a compressor whose compression ratio is 5 kgf/cm² or over, since a compression heat of about 300° C. is applied to the upper surface of the piston at the time of the maximum compression, thermal expansion occurs, resulting in a problem that even small abrasion of the ring body causes the piston to come slidably in contact with the cylinder.

To overcome such a defect, in the known compressor, a polytetrafluoroethylene (PTFE) type resin material good in sliding performance is used for the ring body, and the clearance between the piston and the cylinder is set in the order of 1 to 2% (0.5 to 1 mm for a piston outer diameter of 50 mm φ) for the piston outer diameter.

However, in such a constitution, the clearance between the piston and the cylinder becomes unnecessarily excessive, for example, in the early stage of the compression, or in the intermittent operation, and correspondingly the compression efficiency is liable to lower.

To overcome the defect, a technique is disclosed wherein the surface of the piston made of aluminum material is coated with a self-lubricating resin, and even if the piston outer circumference is allowed to come directly and slidably in contact with the cylinder, drag or the like is prevented from taking place, but since the heat resistance strength of the self-lubricating resin such as PTFE often used in conventional piston rings or the like is about 200° to 250° C., if the adiabatic compression ratio is brought to 5 kgf/cm² or over, the compression heat easily reaches the heat resistance temperature of the PTFE or higher, leading, for example, to a possibility of deterioration, or deformation of the piston surface coating, or a possibility of occurrence of peeling or cracks of the piston surface coating caused by the difference in coefficient of thermal expansion between the piston body made of aluminum material and the piston surface coating. Therefore, this technique is accompanied by a defect that the technique cannot be applied except compressors for low pressure wherein the temperature rise due to the compression heat is low.

Further, in any of the above prior techniques, although the piston itself is made of a metal material, particularly aluminum material in order to make it light in weight, since aluminum material is high in coefficient of thermal conductivity, the compression heat received at the piston top surface is transmitted to the whole piston, and particularly the temperature of the pinhole section for transmitting the movement of the connecting rod for driving the piston through the piston pin becomes high. In addition in the case of an oilless compressor, since means of cooling said piston pin section with an oil cannot be used, heat resistant bearing parts or the like must be used, the load on the piston pin section is large per unit area in comparison with other bearing, and as a result a bearing having heat resistance and load bearing quality must be used, which makes the cost higher and leads to liability of lowering the durability.

Generally, in reciprocating compressors, the piston ring for airtight sealing is in the shape of the letter C formed by cutting one part of a ring in order to allow the insertion into the ring groove. In particular in the case of oilless compressors in comparison with oil-fed type compressors, as described above, the clearance between the piston and the cylinder is large, and gas leakage is liable to occur through the joining section (opening section) of the ends of the ring.

Therefore, similarly to usual compressors, in oilless compressors, the opening section is contrived to be formed, for example, into a shape having a stepped cut, and multi-stage rings are arranged so that the openings of the rings may not be aligned to be circumferentially offset, but even if such a constitution is used, since there is an annular clearance between the cylinder and the piston land section between the upper and lower piston rings, the openings of the adjacent rings are allowed to be in communication with each other through said clearance, and therefore gas leakage cannot be prevented.

To overcome such a defect, a technique is considered wherein a pin or other means of fixing the piston ring is arranged in the ring groove of said piston so that the position of the opening section may be fixed on the side of the side thrust that is brought in firm contact with the cylinder in the compression step. (Such a technique is known in Japanese Utility Model Publication No. 26236/1985 in the field of oil-fed type compressors, but is novel in the field of oilless compressors.)

However, in oilless compressors, since the piston is kept out of contact with the cylinder, even if it is tried to seal the side thrust side in firm contact with the cylinder by the opening sections of the piston rings, complete sealing thereof cannot be possible so long as there are the opening sections cut in the longitudinal direction. In addition, since the piston ring used in oilless compressors is not made of a metal, but is made of a resin, it is difficult to make the piston ring have a construction wherein part of the piston ring is cut out to be engaged with the pin, while if a pin is provided at the part corresponding to said opening section, the opening section is separated, and the gas will leak from the separated part.

SUMMARY OF THE INVENTION

Taking the defects of the prior art into consideration, an object of the invention is to provide an oilless reciprocating compressor/expansion apparatus wherein drag or lowering of the compression efficiency (expansion efficiency) will not take place.

Another object of the present invention is to provide an oilless reciprocating compressor wherein if high compression heat comes in contact with the piston top, deformation, deterioration or the like of the piston will not take place.

A still another object of the present invention is to provide an oilless reciprocating compressor/expansion apparatus wherein leakage of a gas from the opening section or drag will not take place and the high compression efficiency (expansion efficiency) can be kept for a long period of time.

SUMMARY OF THE INVENTION

To achieve the above object, in the invention claimed in claim 1, a thermosetting condensed polycyclic polynuclear aromatic resin (hereinafter referred to as COPNA resin) that has been developed in recent years is used as a molding material, a heat-resistant material for increasing slidability such as graphite and, if required, a material for increasing strength such as carbon fiber are mixed with said resin to prepare a resin type composite material increased in self-lubricity as well as heat resistance and strength, and the composite material is molded into a piston body.

According to the above-mentioned invention, since the heat deformation temperature of the COPNA resin itself is 250° C. or over, and the molding resin further containing graphite or the like that is a material high in heat resistance is molded, the heat resistance can easily be retained at about 300° C. or over, and therefore if the adiabatic compression ratio is set at 5 kgf/cm$^2$ or over (the compression heat being about 300° C.), the piston is not deformed thermally at all and the heat resistance would not be deteriorated for a long time of period.

Further, since said composite material is mixed with graphite or the like to increase the slidability and is molded, the composite material has a self-lubricating function, and as a result if the piston itself comes in slidably contact with the cylinder, smooth sliding performance can be obtained without dragging or the like.

Further, since the coefficient of thermal expansion thereof is much lower than that of aluminum material, if the clearance between the piston and the cylinder is made small, any problem will not occur, and therefore the compression efficiency can be improved rather. In this case, the most preferable clearance to secure high compression efficiency without causing drag due to thermal expansion is to allow firm fitting to such an extent that will not cause drag, and more specifically the clearance is to be set preferably in the range of 0.1 to 5% at normal temperatures for the diameter of the piston. Particularly, since said piston is low in coefficient of thermal expansion in comparison with that of aluminum material, the compression heat amount stored in the piston top is large, and the coefficients of thermal expansion at the upper part and the lower part of the piston are different during the compression operation, so that the clearance between the piston and the cylinder becomes nonuniform, which is liable to affect adversely the compression efficiency. Consequently, in a preferred embodiment of the present invention, the diameter of the higher side of the piston is made smaller relative to the diameter of the lower side, and preferably it is made thicker toward the end.

On the other hand, the fact that said composite material is much lower in coefficient of thermal expansion in comparison with that of aluminum material rather brings about a preferable effect on the bearing section on the piston pin side.

That is, since the piston made of the composite material is low in coefficient of thermal expansion, the rate of the amount of the compression heat received by the piston top surface that is released from the metal cylinder is larger than the rate of the amount thereof that is transmitted to the piston side from said top, and as a result the rise in temperature of the piston pinhole is suppressed. Consequently, the piston pin section can be formed without taking heat resistance into consideration, and since said piston itself is provided with a self-lubricating function, the piston pin can directly be fitted without providing a specific bearing member.

Thus, the number of parts can be reduced, the cost can be lowered, and since said pinhole section is not exposed to high temperatures, the durability can be improved.

Said pinhole section undergoes an impact at the time of transition from the ascending step of the piston to the descending step or from the descending step to the ascending step. In the construction using a prior bearing, said impact brings about deterioration or the like of the bearing, while, in the present invention, since the piston made of a resilient composite material is allowed itself to function as a bearing, the piston absorbs the impact, and therefore the durability can be improved.

Since the heat conduction of the piston itself of the above-mentioned invention is low in comparison with that of aluminum material, the piston pin can be prevented from being heated too much, but high heat is accumulated in the piston top on the contrary, and therefore there is a possibility that the compression efficiency is lowered even through the temperature will not exceed the heat resistance temperature of the composite material itself.

Thus, in another aspect of the invention, the smooth sliding function of the cylinder and the piston pin section and the heat resistance (heat transmitting) function on the side of the top opposite to the discharge/suction valve, that is, the side of the piston top in contact with compression heat are separated, at least the part of the outer circumferential section that slides on the cylinder and the piston pinhole section are made of a self-lubricating heat-resistant material, and the piston top is made of a material good in heat conductivity such as aluminum, thereby overcoming the above defect.

According to the above constitution, since the piston top side in contact with the compression heat is made of aluminum or the like, for example even if the adiabatic compression ratio is made high and the compression heat rises to about 300° C., the top will not be deformed or deteriorated, and said top will be cooled by the contact with the cool sucked gas. Thus, the compression heat is not accumulated and released easily through the discharged air, and as a result the temperature transmitted to the part made of the self-lubricating heat-resistant material located below it is not heated near to the compression heat, and if the self-lubricating material comprises for example a fluorocarbon resin whose heat resistance temperature is low, the temperature can be retained at or below the heat resistance temperature easily.

In this case, by making, of a good heat conductor, the top land 14 to which the compression temperature is easily transmitted as well as the piston top, said heat releasing efficiency can be further improved, and the use of a fluorocarbon resin low in heat resistance temperature becomes further possible, but in this case, by making the outer diameter of said top land section slightly smaller than the diameter of the piston below it in order to obviate the sliding on the cylinder side, drag of the top land section is prevented, and smooth piston sliding performance is secured. That is, at least the outer circumferential surface side of said piston body that slides on the cylinder is made of a self-lubricating material, and since said outer circumferential surface obviates the transmission of the compression heat as far as possible, smooth slidability can be secured even if a material low in heat resistance temperature is used.

Therefore, the self-lubricating heat resistant material in the present material is not necessarily limited to a composite material of COPNA resin, and polytetrafluoroethylene (PTFE) type resins or their composite materials or fluorocarbon resins can be used.

According to a further aspect, the constitution of the invention is such that a piston is formed by integrally molding said composite material around a piston core made of a metal material, and more particularly the piston outer circumference that slides on the cylinder and said pinhole part may be integrally molded using a thick coating of said composite material with the piston top and the core of a metal material on the back side thereof exposed.

Also, the piston body is made of a self-lubricating heat-resistant material, a metal body good in heat conductivity is arranged at least on the piston top side opposite to the discharge valve, and they may be integrated by using any suitable attachment means.

In this case, by extending the good heat conductor on the piston top side substantially to the back side of the piston top directly or through joining bodies such as rivets, the heat is released from the inside of the piston to reduce the movement of the heat to the piston sliding surface side, the increase of the temperature on the circumferential section side can be avoided as far as possible, and smooth slidability between the piston and the cylinder can be secured.

In order to prevent the gas from leaking through the opening sections of the piston rings, another aspect of the present invention is based on the following three ideas.

The first idea resides in that even if it is tried to seal the side thrust side in firm contact with the cylinder in the compression step by the opening sections of the piston rings, complete sealing is impossible so long as there are opening sections cut in the axial direction, and since, in the prior oilless reciprocating compressor, the piston and the cylinder are kept out of contact, the sealing must be done only by the opening sections, the conditions are unfavorable in comparison with the case of the oil-fed type compressor.

Therefore, another aspect of the present invention resides in that the piston or its sliding surface is made of a self-lubricating material to allow the piston itself to be slid on the cylinder, and the airtight sealing is made substantially possible by the circumferential surface of the piston itself that is positioned at the side thrust section in firm contact with the cylinder in the compression step.

In this case, the piston sliding surface opposite to the cylinder may be made of a self-lubricating material, and both the cylinder side or the cylinder and the piston or only its surface layer section may be made of a self-lubricating material.

However, even in the above constitution, if there is a ring groove in said side thrust section, the sealing conditions depend inevitably on the piston ring, in other words, on the opening sections of the piston rings present in the ring groove positions.

Therefore, in the present invention, without providing ring grooves in said side thrust positions, said ring grooves are formed into the shape of the letter C and are spaced at the side thrust section thereby allowing the piston circumferential surface itself to act for the sealing.

The means for preventing revolution of the openings of said piston rings uses the spacing part formed at said side thrust positions. The piston assembly is made circular by the combination of the spacing sections of said ring grooves and the piston rings, and said seal circle can be used to seal said cylinder in an airtight manner.

The present invention is not limited to the above oilless single-stage compressors but also can be applied to oilless single-stage reciprocating expansion apparatuses and oilless multi-stage reciprocating compressors. In the case of the former expansion apparatuses, the above-mentioned constitution may be used for the piston itself that is positioned at the side thrust section in firm contact with the cylinder in the expansion step, and in the case of the latter multi-stage reciprocating compressors, the above-mentioned constitution may be applied to the side thrust section in firm contact with the cylinder in the piston ascending step in the lower stage side, and may be applied to both side thrust sections in the piston ascending step and the piston descending step in the higher stage side That is, the outer circumferential surface side of said piston body that slides at least on the cylinder is made of a self-lubricating heat-resistant material, and as described above, since the heat transmission of the compression heat is avoided as far as possible, the above-mentioned smooth slidability can be secured easily.

BRIEF DESCRIPTION OF THE DRAWINGS

FIG. 7 shows a piston of another embodiment, and (a) is a view thereof, partly in cross section, (b) is an bottom plan view thereof, and (c) is a cross-sectional view taken along line A—A' of (b).

FIG. 9 is a perspective view of essential parts, showing the shapes around its piston FIG. 10(a) is a schematic view, showing another embodiment wherein the invention is applied to an oilless single-stage reciprocating expansion apparatus, and (b) a cross-sectional view taken along line B—B' thereof.

EMBODIMENTS

Now, preferred embodiments of the present invention will be illustrated in detail with reference to the drawings. However, unless otherwise specified, the dimensions, materials, shapes, relative positions, etc. of the constitutional parts of the illustrated embodiments are not intended to limit the scope of the invention, but are described for the purpose of illustration.

Figure 1:
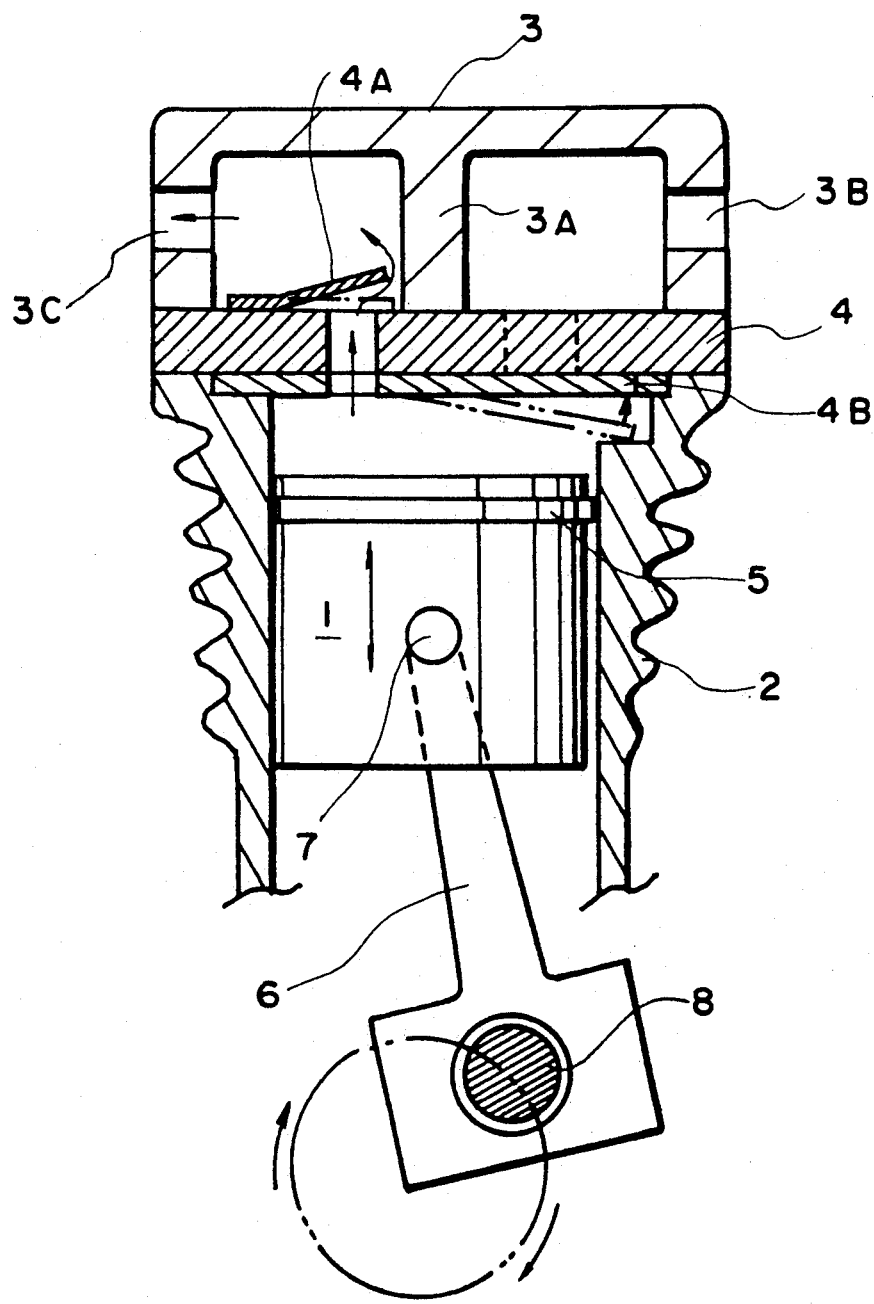
FIG. 1 is a cross-sectional view, showing an oilless reciprocating compressor to which the present invention is applied.

Now, referring to FIG. 1, the essential parts of the constitution of an oilless compressor to which the present invention is applied will be described. Reference numerals 2 and 3 indicate respectively a cylinder and a cylinder head made of aluminum or other metal material good in electroconductivity, and a spacer 4 in which a discharge valve 4A and a suction valve 4B are built is sandwiched between the members 1 and 2. The inside of the cylinder head 3 is divided by a partition wall 3A into cells, one of which is provided with a suction port 3B in communication with the suction valve 4B and the other of which is provided with a discharge port 3C in communication with the discharge valve 4A.

On the other hand, a piston 1, around which a piston ring 5 is fitted is disposed in the cylinder 1, and can be reciprocated through a connecting rod 6 and a piston pin 7 by the rotation of a crank-shaft 8 in known manner, so that the air sucked into the space over the top of the piston 1 via said suction valve 4B is adiabatically compressed and can be discharged from the discharge valve 4A toward the discharge port 3C to perform the prescribed compression operation. Since this operation is well known, the description is omitted.

Figure 2:
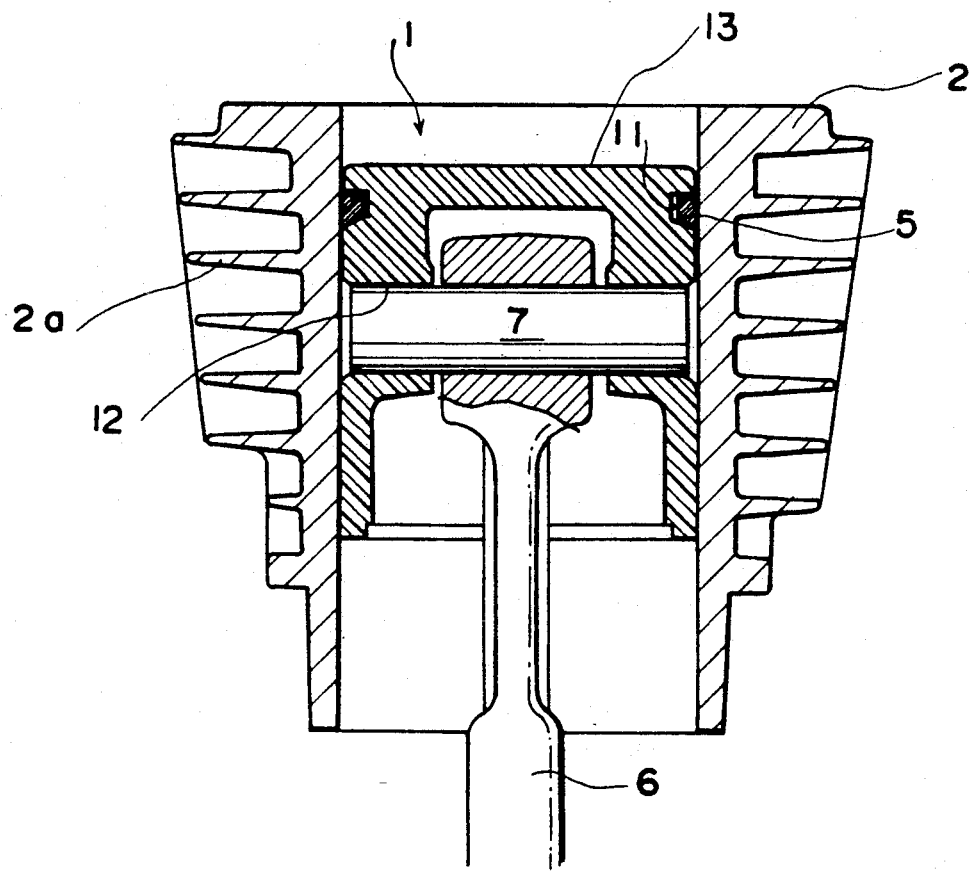
FIG. 2 is a cross-sectional view, showing the constitution of essential parts of an oilless reciprocating compressor according to one embodiment of the invention.

FIG. 2 shows an embodiment of the first invention, showing the constitution of essential parts of the piston and the cylinder section to be built in the above oilless compressor.

The cylinder 2 is made of an aluminum alloy as known in the art, the outer circumferential surface is provided with fins 2a, and the piston sliding section on the inner circumferential side is treated to have a hard anodizing film.

Before describing the shape of the piston 1, the procedure of the production of the piston 1 will be described in detail.

As shown in U.S. Pat. No. 4,758,653, the piston 1 is molded using a molding material, which is prepared by mixing a resin material (available under the trade name of SK resin (SUMITOMO METALS CO., LTD.)) based on a COPNA resin formed by crosslinking molecules of a condensed polycyclic aromatic compound through benzene rings each having two methylene chains in the parapositions (Japanese Patent Laid-Open (KOKAI KOHO) No. 521,522/1987) with graphite powder in a ratio of 6 to 4 under such molding conditions that the molding temperature is 170° to 220° C., the molding pressure is 200 to 300 KG/cm$^2$, and the hardening time is 1 min per a thickness of 1 mm by the same compression molding means as for the molding of phenol resins.

The thus formed piston 1 has the following physical properties: the coefficient of thermal expansion is $4.4 \times 10^{-5}$/deg, and the coefficient of thermal conductivity is 1.12 kcal/m/.hr °C. The coefficient of thermal expansion and the coefficient of thermal conductivity of the thus formed piston 1 were 1.9 times and 1/86 times respectively as high as those of a conventional piston 1 made of a prior aluminum alloy (the coefficient of thermal expansion is $2.3 \times 10^{-5}$/deg, and the coefficient of thermal conductivity is 0.013 kcal/m/.hr °C.), indicating high heat-insulating properties and heat storing properties.

Next, the shape of the piston 1 will be described. The outer diameter is increased from the piston top 13 toward the piston skirt section by taking the heat gradient into consideration, and since the difference Δb between the coefficients of thermal expansion of the piston 1 and the cylinder 2 is $2.1 \times 10^{-5}$/deg, assuming the difference between temperatures of the upper part and the lower part of the piston 1 to be. Δt, and the outer diameter of the piston 1 to be P, if the difference of the diameter is set as Δt.P ($2.1 \times 10^{-5}$/deg), the clearance of the piston 1 and the cylinder 2 during the compression operation can be kept uniform.

Since the compression heat received at the piston top 13 is about 300° C., by setting said clearance to be about 0.1 to 0.5% at normal temperatures for the diameter of the piston 1, dragging would not take place during the compression operation, and the clearance between the piston 1 and the cylinder 2 can be made to be a minimum value that will not impede the reciprocative movement, then since the whole of the outer circumference of the piston 1 can be caused to function as a surface sliding on the surface of the cylinder 2, the graphite of the piston is transferred to the cylinder thereby improving the slidability and sealing properties, and thus leakage of the gas that will occur through the circumferential surface of the piston, from the opening section of the below-mentioned piston ring 5, etc. can be reduced thereby improving the compression efficiency.

The piston 1 is formed with a ring groove 11 and a pinhole 12 below the ring groove 11.

The ring groove 11 is in the form of a ring and is located near the piston top 13. The piston ring 5 made of PTFE resin is fitted in the ring groove 11.

In this embodiment, since the piston itself is provided with a sealing effect to a certain degree, it is not required to provide two piston rings 5 as in the prior apparatus, and the single piston ring 5 can secure a prescribed sealing effect.

Said pinhole 12 is extended through approximately the middle position of said piston 1, and is abraded so that it may function directly as a bearing.

A piston pin 7 is arranged in said pinhole 12, and the piston 1 is moved up and down by the rotational movement of the crankshaft through the connecting rod 6.

Figure 3:
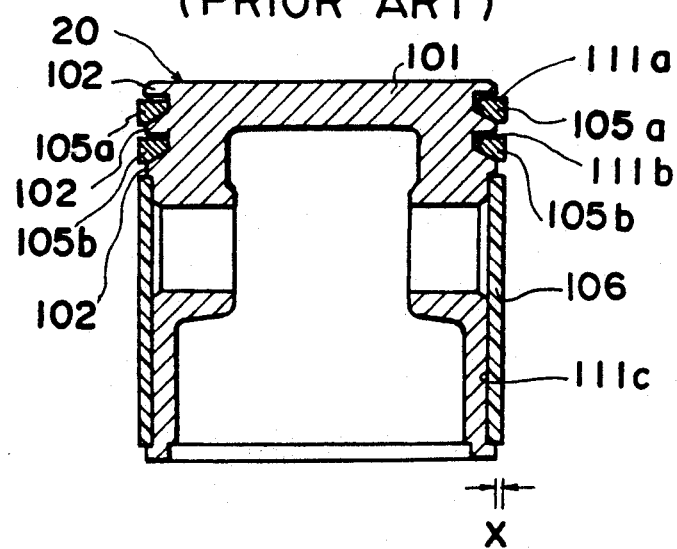
FIG. 3 is a cross-sectional view, showing the constitution of essential parts of a prior art oilless reciprocating compressor.

In this case, at the transition from the ascending step of the piston 1 to the descending step or the transition from the descending step to the ascending step, the piston 1 undergoes a shock, and in the structure using a prior bearing, deterioration and the like of the bearing would occur due to the shock, but in the present invention since the resilient piston 1 itself is allowed to function as a bearing, the shock is absorbed by the piston 1, and therefore the durability can be improved When a prior piston 101 shown in FIG. 3 was used in the above-mentioned oilless compressor, and the piston 1 of this embodiment was used in the above-mentioned oilless compressor (the piston diameter: 50 mm), and after they were operated continuously under a load of 7 kgf/cm$^2$ for 1,000 hours, they were disassembled. As a result, a drag mark was observed on the land section of the piston 1 of the prior compressor, and it was confirmed that the bearing fitted to the pinhole 12 of the piston pin 7 was worn out, causing the noise during the operation under the load to become large. On the other hand, after the passage of 1,000 hours, although the piston of this embodiment had an accustomed mark on the sliding surface, it was not a drag mark, the degree of the wear at the pinhole 12 was very little, and it was confirmed that there was no looseness between the pinhole 12 and the piston pin 7. With respect to the temperature, a decrease of 25° C. can be observed at the piston section.

Figure 4:
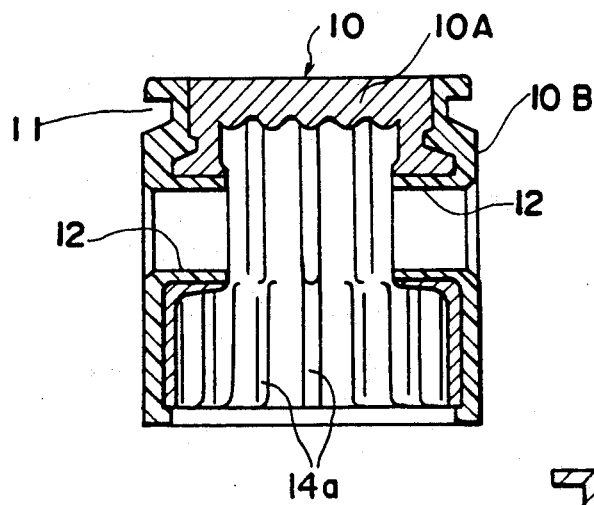
FIGS. 4, 5, and 6 are cross-sectional views, respectively showing pistons of additional embodiments of the invention.

FIG. 4 shows a piston 1 of another embodiment of the invention used in the above compressor, in which the piston 10 is formed by integrally molding a thick coating of said composite material 10B around the a piston core 10A made of a metal material.

The specific constitution will be briefly described. Said piston core 10A is made of an aluminum alloy, the upper surface is made flat, and the inner circumferential surface side is provided with a finlike projections 14a along the axial direction. The thick coating of said composite material 10B is integrally molded with the outer circumference of the piston core 10A and the piston pinhole 12 to form the piston 10.

That is, with the piston top 13 and the piston core 10A on the back side thereof exposed, the thick coating of said composite material 10B surrounds the outer circumference of the piston 10 in sliding contact with the cylinder 2 and said pinhole 12.

Preferably, the thickness of said composite material 10B is 1 to 3 mm on the pinhole 12, and about 2 to 3 mm on the circumferential section in the case of the piston 10 having a diameter of 50ϕ.

According to this embodiment, the same effect as that of the first embodiment can be obtained, and since the piston top 13 and the inner circumferential side whose temperature will become the highest are made of an aluminum alloy good in heat conductivity, the compression heat generated at the piston top 13 is radiated through the inner circumferential surface of the piston 10. It thus can be used in a high-pressure compressor, and therefore the compression efficiency can be improved.

For example, with respect to the rise in the temperature of the embodiment 1 shown in FIG. 2 wherein the whole of the piston 1 is made of a composite material and the rise in the temperature of the piston 10 of this embodiment after the operation for 1 hour under a load of 7 kgf/cm$^2$, in the embodiment 1, the rise in the temperature at the back of the piston 1 was 125° to 130° C., while in this embodiment the rise of the temperature was 80° to 90° C., which is a great decrease, and at the piston pinhole 12 the decrease in the temperature was about 10° C. lower than that of the embodiment 1, so that it could be estimated that the durability would be improved.

Figure 5:
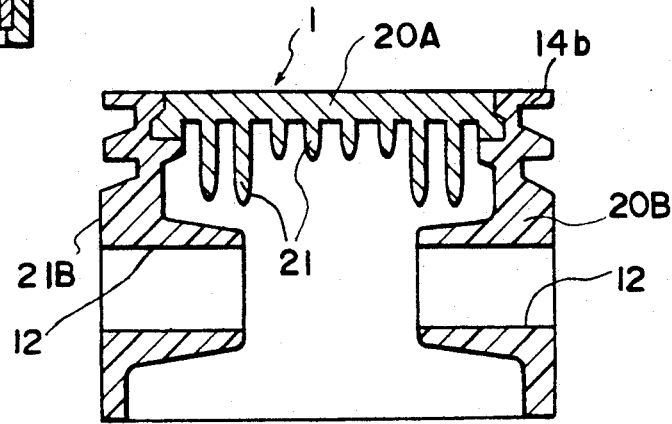

FIG. 5 shows a modification of the above embodiment, illustrating a piston 1 wherein all of the outer circumferential section 21B of the piston 1 is made of said heat resistant composite material 20 B, a head section 20A surrounded by the piston is made of an aluminum alloy, and a plurality of depending radiation fins 21 are provided on the inner circumferential surface side of the head section 20A. According to this embodiment, in addition to the effect of the above-mentioned embodiment, the heat dissipation of the piston top 13 is increased by the radiation fins 21 so that the cooling effect of the piston 1 is further increased, and since all of the outer circumferential section 21B is made of a self-lubricating heat-resistant composite material, dragging on the cylinder 2 is completely eliminated.

In the above-mentioned embodiment, since there is a resin material at a top land section 14b that receives the compression heat directly, there is no way other than to use, as the resin material, a highly heat resistant COPNA resin composite material.

Figure 6:
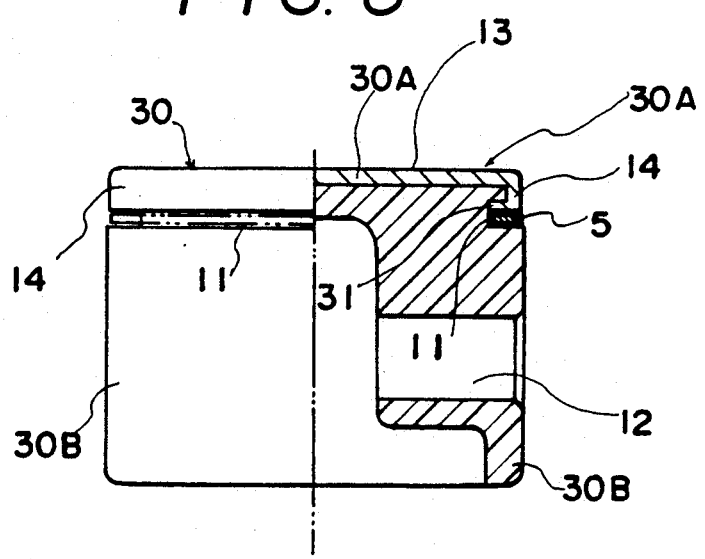

Therefore, to overcome the above defect, in FIG. 6, the top land 14 and the piston top 13 over the ring groove 11 comprises a piston head 30A made of aluminum material and having a prescribed thickness and a piston body 30B of a self-lubricating heat-resistant material integrally molded with the head 30A.

The head 30A including the top land 14 and the piston top 13 having prescribed thicknesses and located over the ring groove 11 is made of aluminum material, and the piston body 30B including the ring groove 11 located below it is integrally molded.

In the head 30A, the outer diameter of the top land 14 is made slightly smaller than the diameter of the piston body 30B below it, and its lower side 31 is bent in the shape of the letter L in cross section to facilitate the association with the piston body 30B.

The piston body 30B may be formed by using a molding material of SK resin with which 40% of graphite are mixed similarly to the above-mentioned embodiment, and casting and molding said molding material integrally with said head 30A previously molded and cured, or may be made of PTFE resin or a PTFE composite material similarly to the piston ring 5 since the heat on the side of the piston top 13 does not come in direct contact with the resin body.

According to this embodiment, since the head 30A that is good in heat conductivity comprises the piston top 13 as well as the top land 14 to which the compression heat is liable to be most transmitted, the heat dissipation effect is further improved, and since said material is used on the side of the piston body, it becomes possible to form a good piston 1 whose heat resistance temperature is 300° C. or over, which means that it will be less deformed thermally.

FIG. 7 shows another embodiment using rivets as a joining means, wherein a piston body 40B and a head 40A are separately formed, and then are integrally joined by rivets 25.

That is, the head 40A is in the shape of the disk that will be formed by cutting the piston 1 horizontally over the ring groove 11, the diameter thereof is made slightly smaller than the diameter of the piston body 40B located below it and made of a self-lubricating resin material, and as shown in FIGS. 7 (b) and (C) said head 40A and the piston body 40B are joined integrally by four rivets 41 good in heat conductivity, and the rivet ends 41a are extended to the back of the piston top 13. Thus, the compression heat transmitted toward the head 40A can be released below the piston 1 through the rivets 41 or can be diffused throughout the piston body 40B. If the head 40A is made thinner, the embodiment can have the same effect as that of the above-mentioned embodiment. Therefore if the head 40A is made thinner, the thermal disadvantage can be obviated.

Figure 8B:
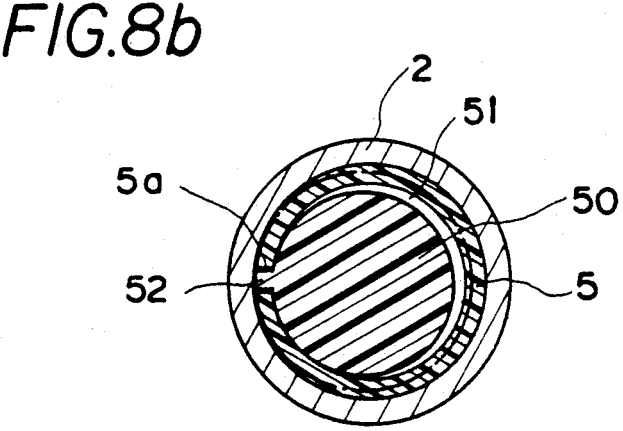
FIG. 8(a) is a front cross-sectional view, showing an embodiment in which the invention is applied to an oilless single-stage reciprocating compressor, and (b) a cross-sectional view taken along line A—A' thereof.
Figure 8A:
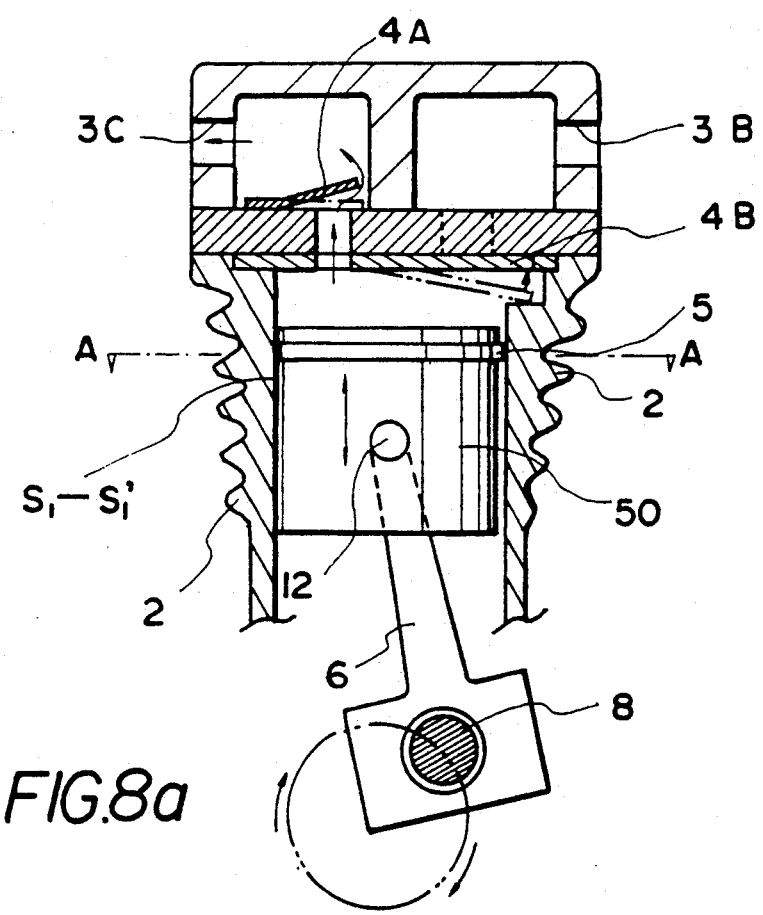

FIGS. 8 and 9 show the constitution of essential parts of a single-stage oilless reciprocating compressor to which the invention is applied.

A piston 50 is formed by integrally molding a molding material of a compound granular resin whose resin skeleton is COPNA resin similarly to the above first embodiment and to which 40% of graphite are added, and as shown in FIG. 9, a piston ring groove 51 and a pinhole 12 to which a piston pin will be inserted are ground or drilled in the outer circumferential surface thereof.

Said ring groove 51 is formed in the shape of the letter C in cross section without the upper and lower ends and side ends being chamfered, the shape of the ring is not formed into a circle around the whole circumferential surface of the piston 1 but is formed into the shape of the letter C, and the part (a spacing part 52) where the ring groove 51 is not formed is formed in such a way that said part is in alignment with a line orthogonal to the insertion direction of the pinhole 12.

In other words, the position of the ring groove 51 is set so that all the circumferential surface of the piston 1 may be continuous in the axial direction without being divided by said ring groove 51 only on said orthogonal line.

On the other hand, the piston ring 5 is made of PTFE resin in a known manner, the cross-sectional shape thereof is rectangular without the upper and lower ends and the side ends being chamfered to conform to the ring groove 51, the planar shape thereof is made in such a way that when said ring 5 is fitted/compressively deformed into said ring groove 51, the shape may correspond to the shape of said ring groove 51, and the opening section 5a at the ends may be brought in firm contact with the ends of said ring groove 51.

After the piston ring 5 is fitted to said piston 50, the piston 50 is associated into the cylinder 2 so that said spacing part 52 may be positioned at a side thrust section $S_1$—$S_1'$ that will come in firm contact with the cylinder 2 in the compression step (ascending step).

According to the embodiment, since the spacing part 52 of the piston is positioned at the side thrust section $S_1$—$S_1'$ that will come in firm contact with the cylinder 2 in the compression step, the side thrust section $S_1$—$S_1'$ is sealed with the circumferential surface of the piston 50 itself including said spacing part 52, and since the opening section 5a is kept at the spacing section 52 without the piston ring 5 being moved circumferentially, inscribed circles which are tangent at the spacing position 52 can be formed by the piston 50 and the piston ring 5.

As a result, at the position except said side thrust section S—S', although the piston 50 and the cylinder 2 are spaced, since said piston ring 5 is tangent internally to the circumferential surface of the cylinder 2 at that section, the combination of the spacing part 52 of said ring groove 51 with the piston ring forms a circle with all the circumference of the cylinder 2 sealed, and the sealed circle can be used to seal said cylinder 2 in an air-tight manner.

FIG. 10 shows another embodiment wherein the invention is applied to an oilless single-stage reciprocating expansion apparatus. In the case of the above-mentioned compressor, when the crank-shaft is rotated counterclockwise to receive compressed air on the upper surface side of the piston 50, there is the side thrust section $S_2$—$S_2'$ on the left side. In the case of the expansion apparatus that is different from the above-mentioned compressor, since the expansion step is present in the step where the piston is descended, the side thrust section $S_2$—$S_2'$ is present on the right side in the case of the reverse direction of the rotation of the crank-shaft 8, that is, in the case of the counterclockwise rotation, and as a result in the case of the expansion apparatus the spacing part 52 is formed on the piston circumferential surface opposite to that of the above-mentioned compressor.

Since, in the case of said expansion apparatus, it is not necessary to take heat resistance into consideration, the molding material of the piston body is not limited only to COPNA resin or its composite material, and the piston body may be made of polytetrafluoroethylene (PTFE) resin or its composite material.

Figure 11:
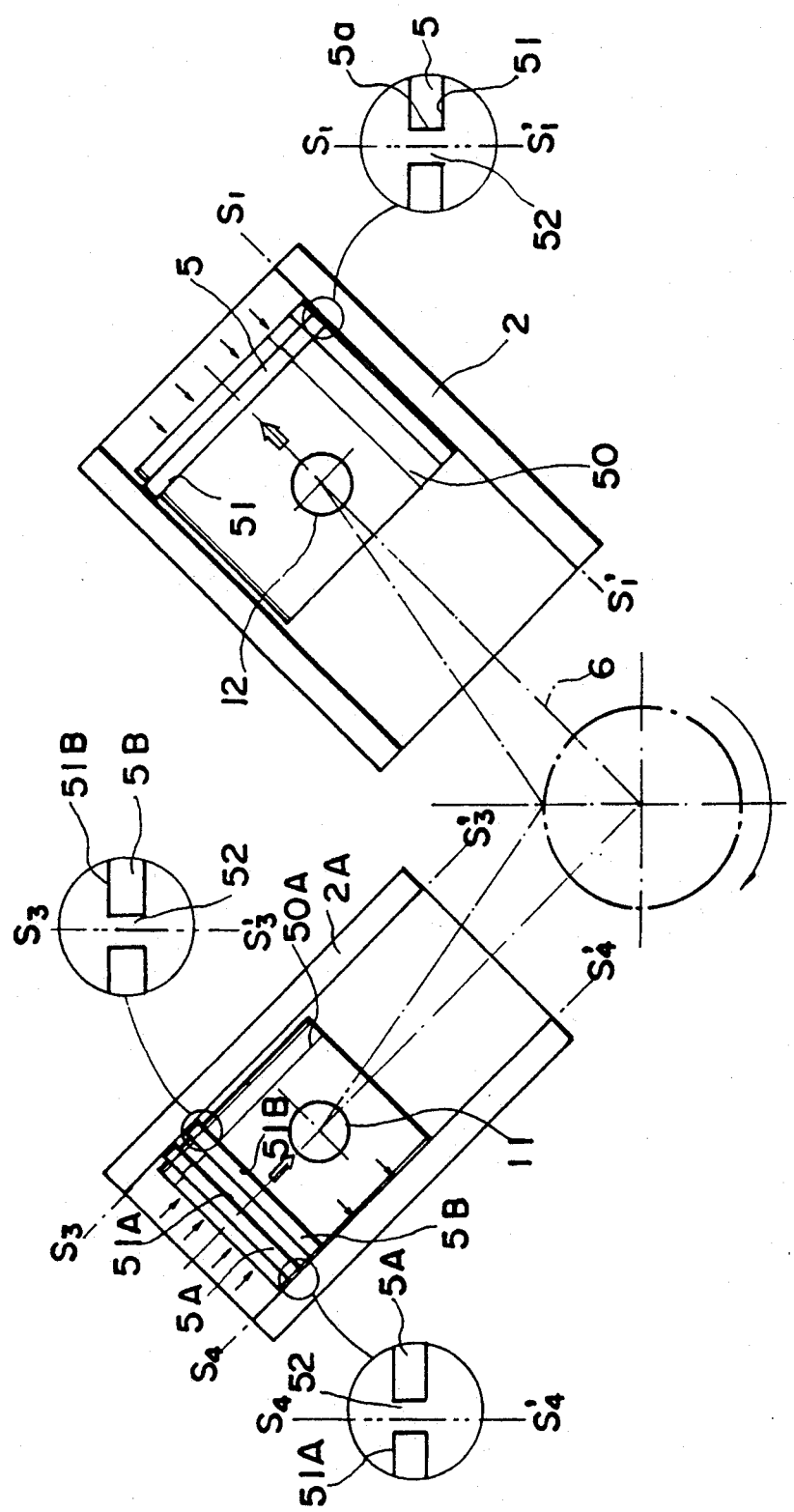
FIG. 11 is a schematic view, showing another embodiment wherein the present invention is applied to an oilless two-stage reciprocating compressor, and (A) shows the suction step on the higher side, and (B) shows the state of sliding contact between the piston and the cylinder in the case of the compression step on the higher side.
Figure 11:
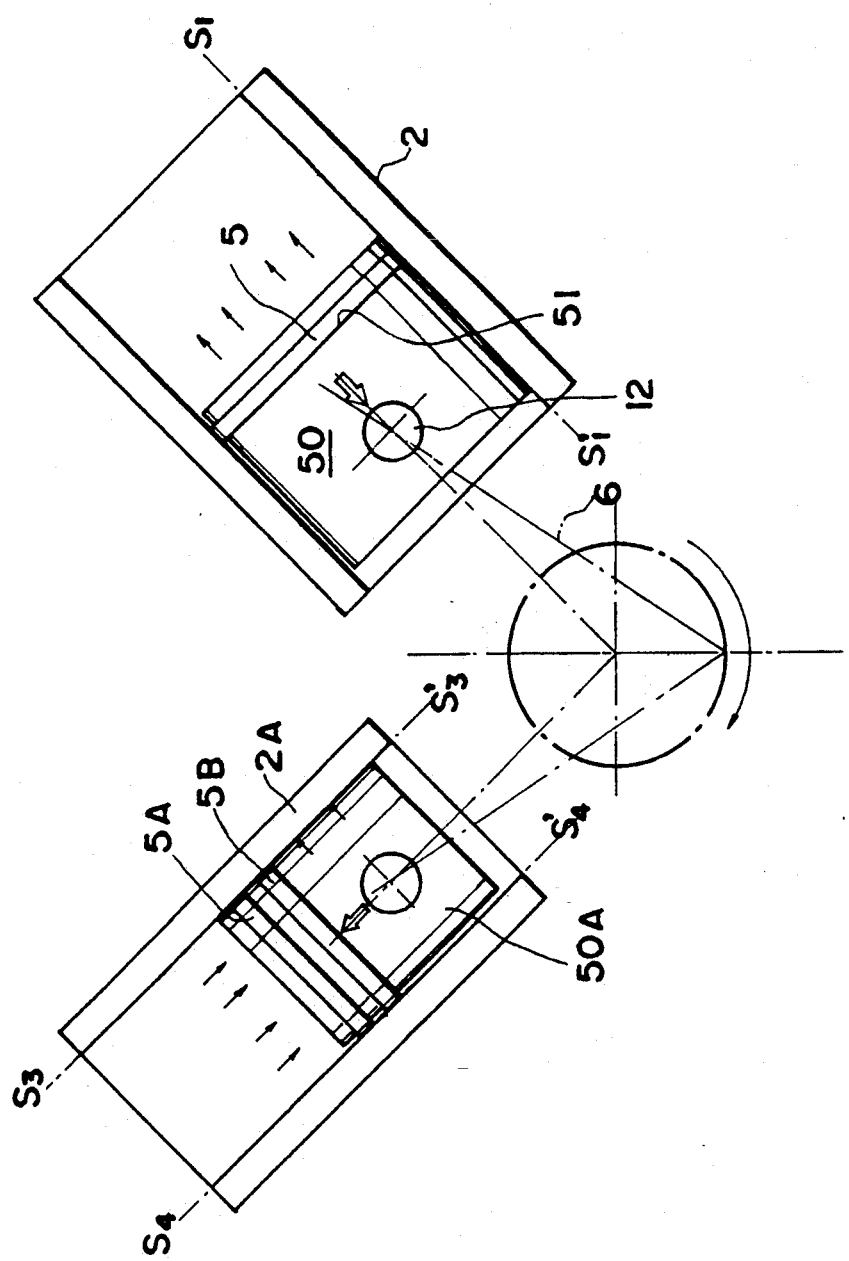

FIG. 11 shows another embodiment wherein the present invention is applied to an oilless two-stage reciprocating compressor in which even in the suction step the air pressure compressed on the lower pressure side is applied on the high-pressure side piston, and as a result the side thrust section $S_3$—$S_3'$ in the suction step is positioned on the opposite side 180° away from the side thrust section $S_4$—$S_4'$ in the compression step.

Therefore, in both cases of the suction step and the compression step, the piston 50A/cylinder 2A is required to be made airtight on the high-pressure side, and therefore in this embodiment, two, that is, upper and lower, ring grooves 51A, 51B are provided, which are symmetrically ground to make 180°, and piston rings 5A, 5B formed similarly to that of the above-mentioned embodiment are fitted thereinto.

As a result, for example, in the suction step on the higher side (see FIG. 11A), the side thrust section $S_4$—$S_4'$ on the side of the top ring 5A is sealed, in the compression step on the higher side (see FIG. 11B), the side thrust section $S_3$—$S_3'$ on the side of the second ring 5B is sealed, and therefore positive sealing becomes possible in both cases of the suction step and the compression step.

What is claimed is:

1. An oilless multi-stage reciprocating compressor comprising a piston to which piston rings made of a self-lubricating material are fitted at the lower side and the higher side, wherein at least the sliding surfaces of the piston and/or the cylinder on the lower side and the higher side are made of a self-lubricating material, ring grooves formed in the circumferential surface of said piston are formed into the shape of the letter C whose ends are spaced a little, said piston is assembled in such a way that said spacing parts are positioned respectively at the side thrust section in firm contact with the cylinder in the piston ascending step on the lower side, and at the side thrust sections in the piston ascending step and the piston descending step on the higher side, and the combination of the spacing parts and the piston ring allows the corresponding cylinders to be sealed airtightly.

2. In an oilless reciprocating compressor/expansion apparatus comprising a piston body arranged in a cylinder in sliding contact therewith and having a substantially annular ring groove, and a split piston ring made of a self-lubricating resilient material disposed in said ring groove, the improvement comprising at least the portions of said piston body in sliding contact with said cylinder being formed of a self-lubricating composite material containing a thermosetting condensed polycyclic polynuclear aromatic resin and a heat-resistant slidability-increasing material, and said ring groove being substantially C-shaped with a partition wall formed in the remaining circumference, said partition wall filling a gap between the ends of said split piston ring.

3. An apparatus according to claim 2 wherein said piston body is made entirely of said self-lubricating composite material.

4. An apparatus according to claim 2 wherein said self-lubricating composite material is integrally molded around a piston core made of a heat-conductive metal to form said piston body.

5. An apparatus according to claim 4 wherein said piston core of heat-conductive metal is exposed at the top and at the underside of the piston, and is entirely surrounded on its sides by said self-lubricating composite material.

6. An apparatus according to claim 4 wherein a plurality of heat-radiating fins are provided on the exposed underside of said piston core.

7. An apparatus according to claim 2 wherein said heat-resistant slidability-increasing material is graphite.

8. An apparatus according to claim 2 wherein said partition wall is located at a portion of the circumferential surface of said piston body corresponding to a side thrust section in contact with said cylinder during a compression stroke.

9. An apparatus according to claim 2 wherein said partition wall is located at a portion of the circumferential surface of said piston body corresponding to a side thrust section in contact with said cylinder during an expansion stroke.

* * * * *